April 5, 1938.    T. R. MILLS    2,113,091
CORN POPPING MACHINE
Filed Aug. 13, 1937    4 Sheets-Sheet 1

Inventor
Theodore R. Mills
by Henry Bleck
Attorney.

April 5, 1938.   T. R. MILLS   2,113,091
CORN POPPING MACHINE
Filed Aug. 13, 1937   4 Sheets—Sheet 2

Inventor
Theodore R. Mills
by Henry Wech
Attorney.

April 5, 1938.  T. R. MILLS  2,113,091
CORN POPPING MACHINE
Filed Aug. 13, 1937  4 Sheets—Sheet 3
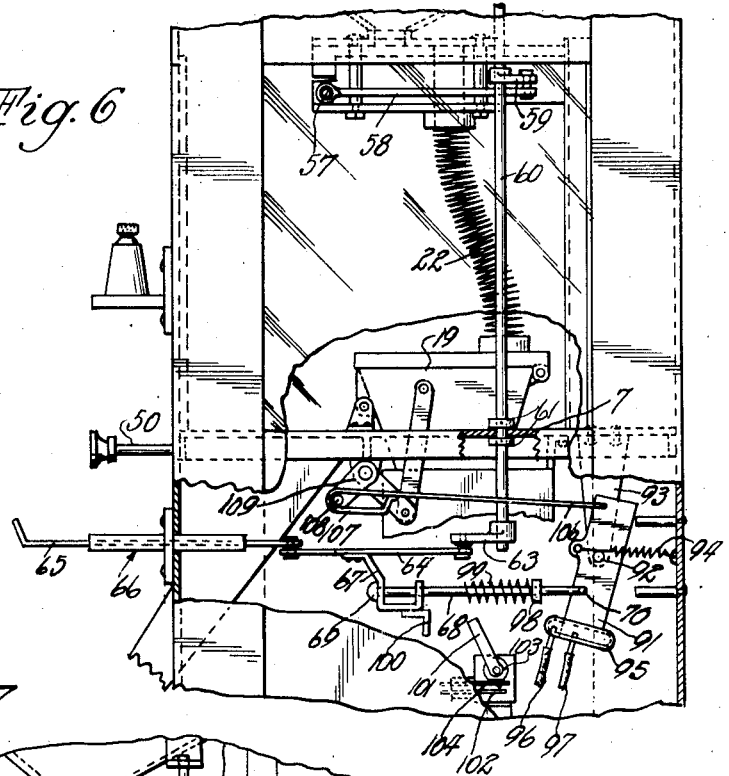
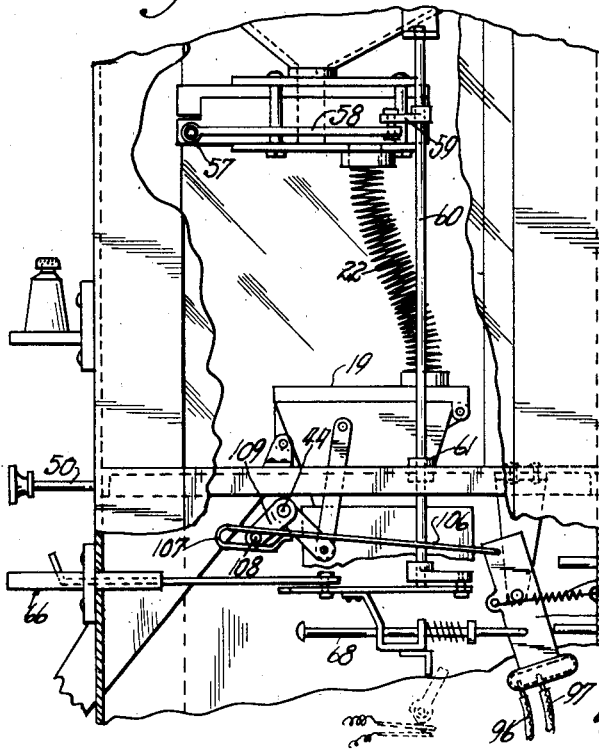
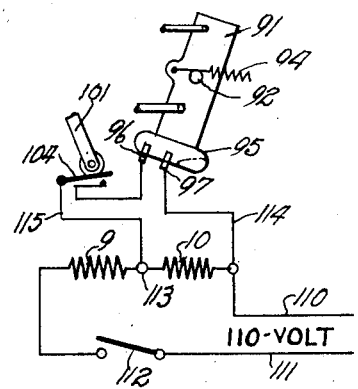
Inventor
Theodore R. Mills
by Henry Blesh
Attorney.

April 5, 1938.   T. R. MILLS   2,113,091
CORN POPPING MACHINE
Filed Aug. 13, 1937   4 Sheets-Sheet 4
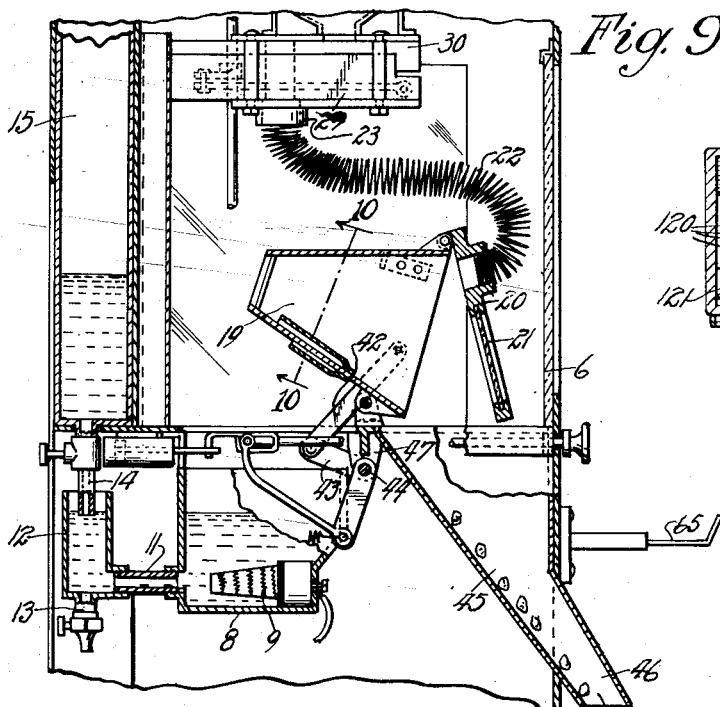
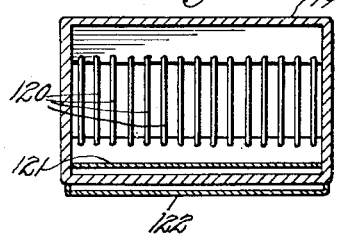
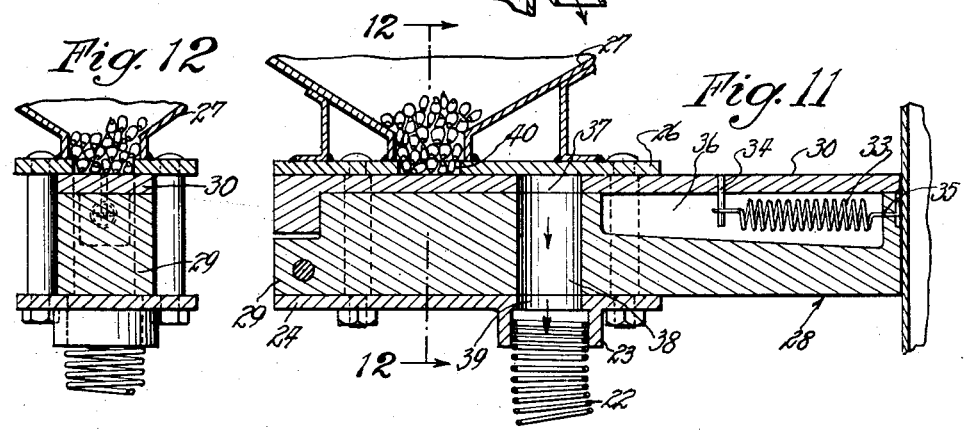
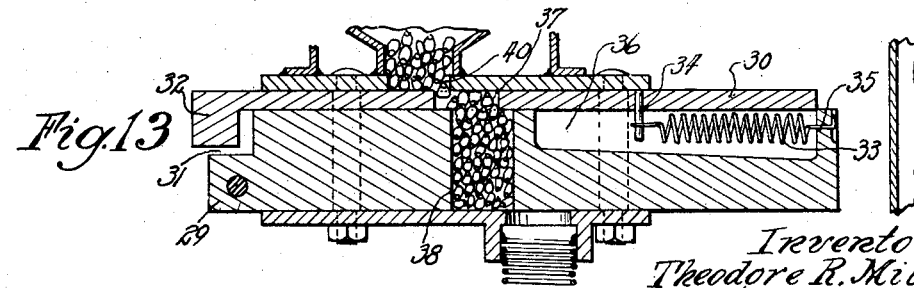
Inventor
Theodore R. Mills
by Henry Mech
Attorney.

Patented Apr. 5, 1938

2,113,091

UNITED STATES PATENT OFFICE 2,113,091

CORN POPPING MACHINE

Theodore R. Mills, Niagara Falls, N. Y., assignor to Daval Manufacturing Company, Chicago, Ill., a copartnership composed of Alexander S. Douglis and David Helfenbein Application August 13, 1937, Serial No. 158,924

12 Claims. (Cl. 53—4)

The invention relates to corn popping machines wherein a coin slide controls the popping of a predetermined quantity of corn.

A further object aims at providing automatic means for increasing the temperature of the trapped oil whenever the receptacle is filled with corn.

Another object aims at providing coin controlled means for increasing the temperature of the trapped oil.

A still further object aims at providing the heating elements removed from the corn receptacle so as to prevent burning of the corn during popping.

Another object aims at providing between the corn reservoir and the corn receptacle a gauge which is constructed to prevent jamming upon irregular discharge of the corn. It is also an object of the invention to provide certain details of construction and arrangement tending to enhance the utility and efficiency of a machine of the type set forth.

With these and other objects in view which will become apparent from a perusal of the invention, the latter comprises the means described in the specification; particularly pointed out in the claims forming a part thereof, and illustrated in the accompanying drawings, in which:

Fig. 6 is a fragmentary side view of the machine with parts broken away to show interior construction.

Fig. 7 is a view similar to Fig. 6 with parts in operative position.

Fig. 8 is a wiring diagram.

Fig. 9 is a section on the line 9—9 of Fig. 2.

Fig. 10 is a section on the line 10—10 of Fig. 9.

Fig. 11 is an enlarged section on the line 11—11 of Fig. 1.

Fig. 12 is a section on the line 12—12 of Fig. 11; and

Fig. 13 is a section similar to Fig. 11 with parts in different position.

Figure 1:
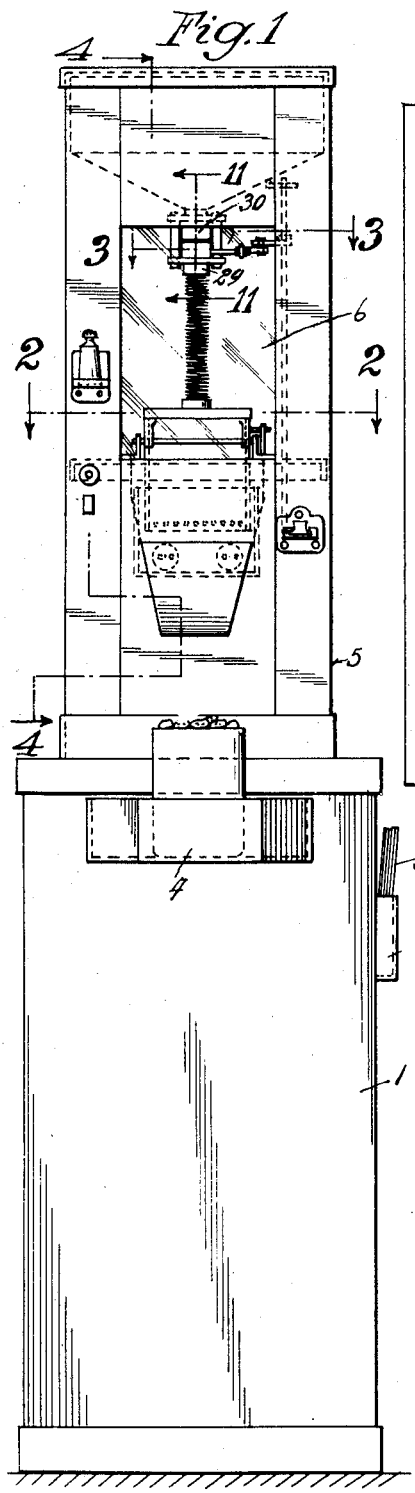
Fig. 1 is a front elevational view of a machine constructed in accordance with my invention.
Figure 2:
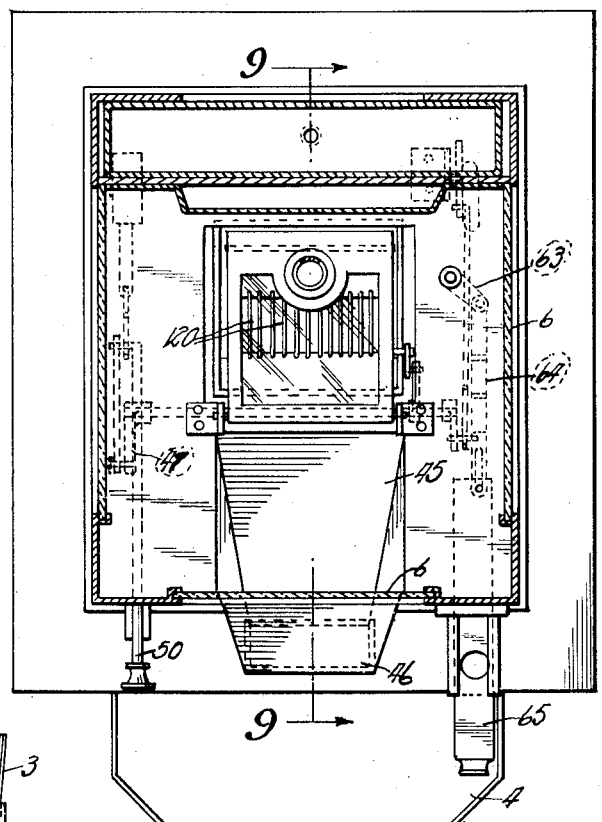
Fig. 2 is an enlarged section on the line 2—2 of Fig. 1.

Referring to the several views of the drawings the corn popping machine depicted therein is of the coin controlled type. The machine is mounted on a base 1 (Fig. 1) which is provided with a receptacle 2 for holding a stack of empty paper bags 3. In receptacle 4 a single bag is placed to receive the popped corn. The machine proper comprises a housing 5 which may be rectangular in shape; the front and the sides are provided with glass panels 6. Mounted within the housing 5 is a partition 7 which supports part of the mechanism. Mounted below the partition is a vessel 8 in which are mounted two heating elements 9 and 10. The vessel 8 communicates by means of a pipe 11 with a gauge tube 12 which may be provided with a drain cock 13. A pipe 14 extends into the tube 12 and communicates with the oil tank 15. Note that the pipe 14 in the tube 12 gauges the height of the oil in the frying vessel.

Hinged as at 17 to brackets 18 mounted upon the partition 7 is a receptacle 19 which is provided with a hinged cover 20. The cover is preferably provided with a window 21 (Fig. 9) and is apertured to receive a coiled spring 22 which extends into a sleeve 23 (Fig. 4) on a fixed plate 24. By means of studs 25 the plate 24 is spaced from a plate 26 which in turn is secured to a hopper 27 for holding kernels of corn. Mounted between the plates 24 and 26 is the gauging assembly generally indicated by 28 (Fig. 11) which serves to measure the amount of corn to be put into the receptacle 19.

The gauging means include a pair of bars 29 and 30 (Fig. 13). The bar 29 is provided with a notch 31 adapted to receive a lug 32, formed on the member 30 and is normally held in position by means of a spring 33, one end of which is secured to a pin 34 of the plate 30 and the other end is anchored as at 35 to the plate 29. A recess cavity 36 in the plates 29 is provided for the spring 33. The plates 29 and 30 are provided with ports 37 and 38, respectively and when in the position shown in Figure 11 and aligned with an aperture 39 in plate 24 communicate with the interior of the spring 22 which in effect serves as a tube for feeding the corn to the popper 19. The plate 26 is also provided with an aperture 40 which communicates with the hopper 27.

If a corn is caught between the plates 29 and 30 when the openings 37 and 40 are nearly in alignment as shown in Fig. 13 crushing of the corn is prevented by reason of the spring 33 interconnecting the plates 29 and 30 so that relative movement between the plates takes place.

Figures 4, 5:
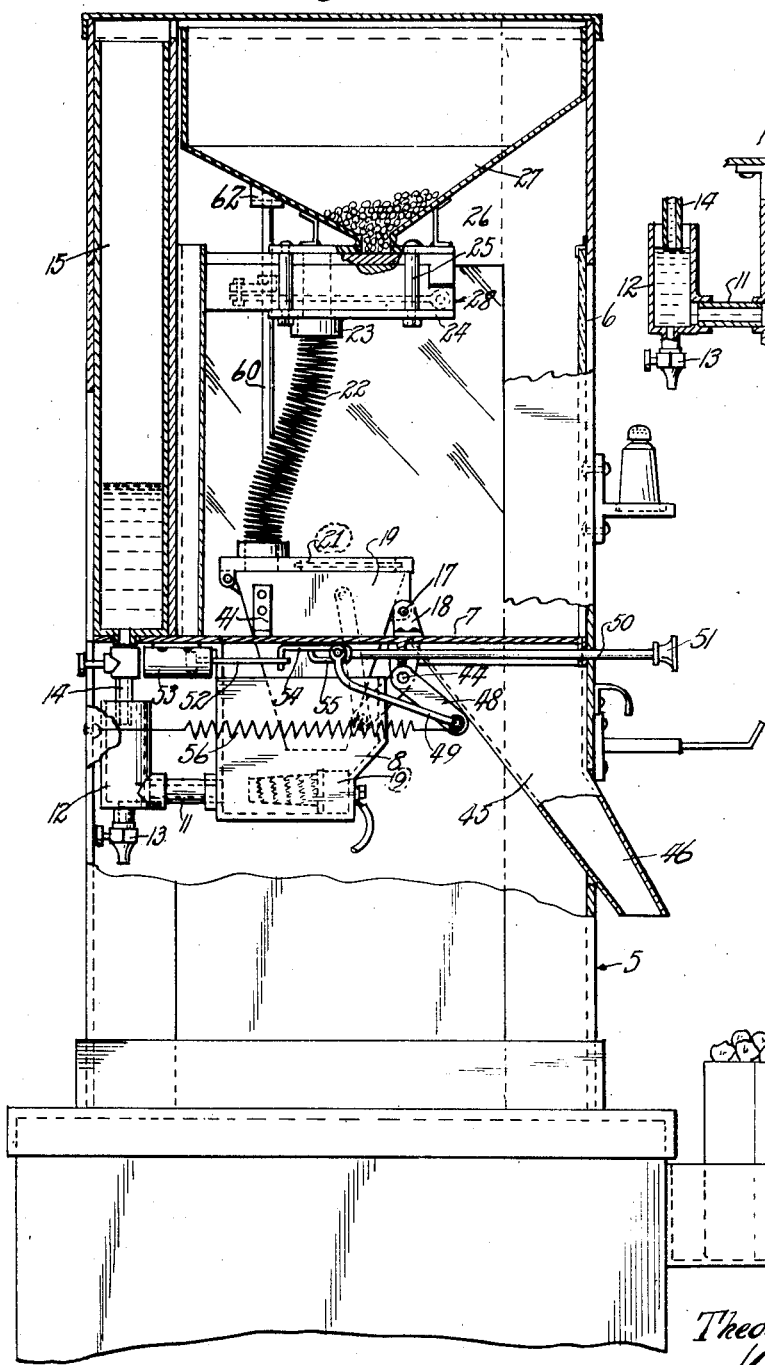
Fig. 4 is a section on the line 4—4 of Fig. 1.
Fig. 5 is an elevational section through the corn receptacle and oil vessel.

The receptacle 19 is normally supported in the position shown in Figure 4 by one or more lugs 41 provided on the receptacle 19 and may be tilted to the position of Figure 9 by means of a link 42 which is pivotally connected to an arm 43 mounted upon a shaft 44. When the receptacle 19 is in the position of Figure 9 it is in alignment with a chute 45 which is provided with an external funnel 46 adapted to receive the popped corn. The shaft 44 is mounted in suitable bearings 47 which may be formed integral with the partition 7. Secured to the shaft 44 is an arm 48 (Fig. 4) which by means of a link 49 is pivotally secured to a plunger rod 50 extending through the housing and provided with a knob 51. The plunger rod 50 also actuates a plunger 52 of a dash pot 53. The plunger rod 50 and the dash pot 53 are connected by a link 54 formed with a loop 55 in order to permit a predetermined amount of travel of the plunger rod 50 so that the receptacle 19 may be tilted somewhat without actuating the dash pot plunger 52. I may provide a spring 56 to assist the parts during tilting.

Figure 3:
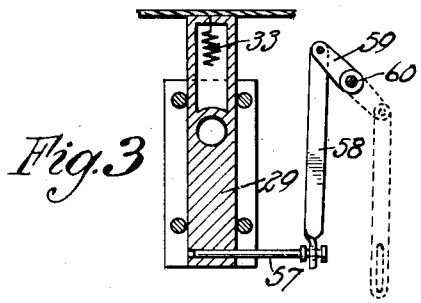
Fig. 3 is a detail section on the line 3—3 of Fig. 1.

For actuating the gauge assembly 28 I provided the following mechanism: The sliding plate 29 (Fig. 3) is provided with a pin 57 which is connected by means of a link 58 with a crank 59 mounted on a vertical shaft 60 which is held for example by spacing collars 61 in position upon the partition 7. A bearing 62 may be provided at its uppermost portion (Fig. 4). The lower end of the shaft 60 is provided with an arm 63 (Fig. 6) which by means of a link 64 is connected to the slide 65 of the coin mechanism generally indicated by 66. Assuming the operator has inserted a coin in the coin slide 65, and manipulates it in the usual manner, then the sliding plates 29 and 30 are moved to the position indicated by Figure 7. The ports 37 and 38 then are in alignment with aperture 40 and a predetermined amount of corn kernels are discharged. After the operator releases the coin slide 65 the coin slide returns to an inoperative position in the usual manner and the sliding bars 29 and 30 are moved into the position of Figure 11 whereupon the kernels trapped in ports 37 and 38 drop under gravity through the spring wire tube 22 into the receptacle 19.

Supported upon the connecting link 64 is a member 67 adapted to support a rod 68 which at one end is provided with a head 69 and at its opposite end is pivoted as at 70 to a plate 91. The plate in turn is pivoted as at 92 to a bracket 93 depending from the partition 7. A spring 94 normally holds the plate 91 in position illustrated by Figure 8. The plate 91 supports a mercury tube 95 which is provided with two terminals 96 and 97. Mounted on the sliding bar 68 is a collar 98 and a spring 99 provided to take up some of the movement of the member 67. The member 67 in addition carries a lug 100 provided to engage a lever 101 of a time switch 102. The lever 101 in turn rotates a cam 103 adapted to close a switch 104, the purpose of which will later appear. When the plate 91 is rotated from position of Figure 6 to the position of Figure 7 by means of the slide 67 the mercury tube 95 is tilted and the terminals 96 and 97 are electrically connected by the mercury within the tube. The spring 94 then holds the plate 91 in position of Figure 7, since the point of mounting the spring on plate 91 has passed the axis of the pivot 92 of the plate.

Pivoted to the plate 91 is a link 106 which is provided with a loop 107 adapted to receive a pin 108 of an arm 109 which is secured to the shaft 44. The loop is provided so that the receptacle 19 may be partially tilted to observe if the corn has popped. If the manually controlled plunger 50 is pushed inwardly to its limit the pin 108 engages one end of the loop 107 of the rod 106 and returns the mercury switch and plate 91 to the position of Figure 6 in which it is held by the spring 94. Return movement of the shaft 44 and plunger rod 50 does not affect the inoperative setting of the mercury switch 95.

Referring to the wiring diagram of Figure 8 I have provided power lines 110 and 111 between which are positioned the heating elements 9 and 10 previously described. One of the power lines may be provided with a manually controlled switch 112 for turning off the power. Shunted between the line 110 and between the heating elements at the junction 113 is the mercury switch 95, the terminals 96 and 97 of which are connected by lines 114 and 115. The line 114 extends to the power line 110, whereas the line 115 extends to the junction 113. In the line 115 is the switch 104 of the timer 102.

Assuming that operator has manipulated the coin mechanism and the kernels have fallen by gravity through tube 22 into the receptacle 19, they are received upon a griddle of wires 120 mounted at the open bottom of the popper 19 and illustrated in detail by Figures 9 and 10. The receptacle is further provided with a plurality of pockets formed by plates 121 and 122. The pockets thus formed serve to receive the oil or grease during tilting of the popper and upon its return to drain it back into the oil pan 8. Note that wires 120 of the receptacle 19 are slightly submerged in oil when the parts occupy the position in Figure 5 and the heating coils 9 and 10 are of substantial distance below the open end of the popper and do not come in contact with the corn. This prevents burning of the corn during popping.

Referring back to the wiring diagram of Figure 8 it is evident that the heating elements 9 and 10 are connected in series and are heated sufficiently to keep the heat of the oil in the pot 8 at approximately 300 degrees F. As the mercury tube 95 is rotated from inoperative position Figure 6 to operative position 7 the heating element 10 is shunted out and the heating element 9 energizes to its maximum capacity which heats the oil to approximately 450 degrees F. which is sufficient to pop corn effectively.

While the drawings show a preferred embodiment of the invention, numerous changes and alterations may be made without departing from the spirit of the invention.

I, therefore, do not limit myself to the details of the invention, as shown but claim my invention as broadly as the state of the art permits.

I claim:

1. In a corn popping machine, an oil reservoir, a corn receptacle movable into and out of said reservoir, means for feeding corn into said receptacle, said receptacle having a grated bottom a plurality of heating elements in said reservoir and below said receptacle to maintain the oil at constant heat, and means eliminating some of said heating elements for increasing the heating effect of the oil upon feeding the corn in said receptacle.

2. In a corn popping machine, an oil reservoir, a corn receptacle movable into and out of said reservoir, a plurality of heating elements in said reservoir to maintain the oil at constant heat, means for discharging corn into said receptacle, and means responsive to actuation of said first named means eliminating some of the heating elements for increasing the heating effect of the oil.

3. In a corn popping machine, an oil reservoir, a corn receptacle movable into and out of said reservoir, a plurality of electrical heating elements in said reservoir, means for discharging corn into said receptacle, and means responsive to the actuation of said first named means for shunting out one of said heating elements.

4. In a corn popping machine, an oil reservoir, a corn receptacle movable into and out of said reservoir, a plurality of electrical heating elements in said reservoir, and means including a mercury switch for shunting out one of said heating elements, said mercury switch having a lost motion connection with said receptacle for being reset thereby.

5. In a coin slide operated corn popping machine, an oil reservoir, a corn receptacle movable into and out of said reservoir, a plurality of heating elements in said reservoir adapted to maintain the oil at a certain temperature, and means actuated by said coin slide for eliminating some of said heating elements to thereby increase the heating effect of the oil.

6. In a coin slide operated corn popping machine, an oil reservoir, a corn receptacle, movable into and out of said reservoir, a plurality of heating elements in said reservoir adapted to maintain the oil at a certain temperature, and a mercury switch operated by said coin slide for said heating elements for shunting out some of said heating elements.

7. In a coin slide operated corn popping machine, oil reservoir, a corn receptacle movable into and out of said reservoir, a plurality of heating elements in said reservoir, a mercury switch for shunting out one of said heating elements upon actuation of said coin slide, and means actuated by said receptacle for resetting said switch.

8. In a corn popping machine, an oil reservoir, a corn receptacle having an open bottom movable into and out of said reservoir, and means on said receptacle for preventing oil gathered in said receptacle to flow therefrom during movement.

9. In a corn popping machine, an oil reservoir, a corn receptacle having an open bottom adapted to be tilted into and out of said reservoir, and catch pockets on said receptacle for trapping oil during outward tilting of said receptacle.

10. In a corn popping machine, an oil reservoir, a corn receptacle having an open bottom adapted to be tilted into and out of said reservoir, and pockets on said receptacle trapping oil during outward movement of said receptacle, and discharging the trapped oil into said reservoir during inward movement of said receptacle.

11. In a corn popping machine, an oil reservoir, a corn receptacle movable into and out of said reservoir, said receptacle having a grated bottom, a plurality of electrical heating elements in said reservoir below the bottom of said receptacle maintaining the oil at a constant heat, and means responsive to filling said receptacle for eliminating some of said heating elements to thereby increase the heating effect of the oil.

12. In a corn popping machine, an oil reservoir, a corn receptacle movable into and out of said reservoir, said receptacle being normally closed at the top by a cover, a hopper, a flexible tube feeding corn from said hopper to said receptacle through said cover, and a plurality of heating elements in said reservoir.

THEODORE R. MILLS.